Patented Oct. 8, 1940

2,216,835

UNITED STATES PATENT OFFICE 2,216,835

POLYMERIC MATERIALS

Wallace Hume Carothers, deceased, late of Wilmington, Del., by the Wilmington Trust Company, executor, Wilmington, Del., assignors to E. I. du Pont de Nemours & Company, Wilmington, Del., a corporation of Delaware No Drawing. Application September 19, 1938, Serial No. 230,725

13 Claims. (Cl. 260—33)

The invention herein described relates to synthetic linear polyamides, and more particularly to plasticized compositions comprising these polymers.

This case is a continuation-in-part of application Serial Number 109,199, filed November 4, 1936 by W. H. Carothers.

The polymers with which this invention is concerned are the fiber-forming synthetic linear polymers described in Patents 2,071,250 and 2,071,253. It is, therefore, to be understood that the expression, "synthetic linear polymer," or "synthetic linear polyamide," as used hereinafter and in the claims, designates the said general types. A characteristic property of these polymers is that they can be formed into filaments which can be cold drawn to fibers showing molecular orientation along the fiber axis. Of these polymers the polyamides are particularly useful for the preparation of fibers, bristles, ribbons, rods, tubes, sheets, and the like. Polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming reactants. On hydrolysis with mineral acids the polyamides revert to the bifunctional reactants from which they are derived. For example, a polyamide derived from a diamine and a dibasic acid yields, on hydrolysis with hydrochloric acid, the dibasic acid and the diamine hydrochloride.

Although the synthetic linear polyamides as a class are microcrystalline and have fairly high and sharp melting points, they can be formed into many useful objects without the use of solvents or plasticizers. This is accomplished by spinning, extruding, or otherwise forming the objects from the molten polyamides. To improve the properties of the products thus formed, it is generally desirable to subject them to a process of cold drawing (application of tensile stress) or to a process of cold rolling (application of compressive stress) or by subjecting them to both cold drawing and cold rolling. The products thus formed are unusually strong, have high melting points, and for many purposes are sufficiently pliable. For certain uses, however, and particularly for use in the form of films, sheets, and the like, greater pliability is sometimes desired.

In the above mentioned application, there are described new compositions comprising the above mentioned polymers and chlorinated hydrocarbons such as decachlorodiphenyl, tetrachlorodiphenyl, and octachloronaphthalene. These and other halogenated hydrocarbons, and also halogenated hydrocarbon ethers when incorporated with the polyamides yield compositions of improved properties, particularly with regard to pliability, which markedly enhance their value for the manufacture of fibers, sheet material products, and other polyamide articles.

This invention has as an object the preparation of new compositions useful in making filaments, bristles, rods, tubes, ribbons, films, sheets, and the like. A further object is to improve the properties, particularly the pliability, of synthetic linear polyamides and of articles derived therefrom.

These and other objects which will be apparent from the following description are accomplished by incorporating in the polyamide a halogenated hydrocarbon or halogenated ether, preferably a polynuclear hydrocarbon or ether.

For most purposes quantities of the halogenated hydrocarbons or halogenated hydrocarbon ethers are used to the greatest advantage in amounts ranging from 1 to 50% by weight of the polyamide, the amount used depending on the nature of the halogenated compound and the properties required in the final product. For some uses where elongation of the films under low loads is desired, an amount of these plasticizers up to 75% may be employed. The addition of halogenated hydrocarbons or ethers causes only a moderate lowering of the melting point and does not materially affect the tensile strength. The presence of halogenated hydrocarbons or ethers does not interfere with the process of cold drawing or cold rolling. Furthermore, the increase in pliability caused by halogenated hydrocarbons and ethers is more marked in the rolled product than in the unrolled product. The presence of halogenated hydrocarbons and ethers also imparts flameproof properties to their compositions.

A convenient method for incorporation of the halogenated hydrocarbon or ether in the polyamide consists in immersing the polyamide in sheet form in a solution of the halogenated hydrocarbon or ether in a non-solvent for the polyamide. Concentrated solutions of the halogenated hydrocarbon or ether in alcohol or benzene are especially useful. Under these conditions the halogenated hydrocarbon or ether is absorbed by the polyamide sheet. In many instances selective absorption occurs as evidenced by the fact that concentration of the plasticizer within the polyamide can be made to exceed that within the solution. After the desired amount of halogenated hydrocarbon or ether has been absorbed by the polyamide, the sheet is removed and dried.

Other methods of incorporating the plasticizer can be used. For example, the polyamide and halogenated hydrocarbon or ether can be dissolved in a mutual solvent and the solution used in making films, filaments, rods and the like, either by evaporative or coagulative methods. The lower fatty acids, e. g. formic acid, are useful solvents for this purpose. Phenols can also be used to advantage. In certain cases, e. g. in the case of the interpolyamides, alcohols and mixtures of alcohols and halogenated hydrocarbons can be used as solvents. Another method of incorporating the halogenated hydrocarbon or ether consists in adding it to the molten polyamide. When this is done it is desirable to exclude oxygen, since this tends to darken the polyamide. Still another method of incorporating the plasticizer consists in adding the halogenated hydrocarbon or ether to the monomeric reactants, e. g. diamine and dibasic acid, from which the polyamide is prepared.

The plasticizing effect of a halogenated hydrocarbon or ether is enhanced by the presence within the polyamide article of a small amount of alcohol or water. The amount of water which the polyamide sheet absorbs from the air under ordinary conditions of humidity, although only a few per cent, is usually sufficient for this purpose.

The invention is described more specifically in the following examples, in which parts are by weight.

*Example I*

A polyamide interpolymer was prepared by heating equimolecular amounts of hexamethylenediammonium adipate and decamethylenediammonium sebacate at 230°–250° C. under conditions permitting the removal of the water formed during the reaction until the polymer had an intrinsic viscosity of about 1.0. Ten (10) parts of this polyamide, 8 parts of a toluene sulfonamide-foraldehyde resin and 6 parts of a polychlorinated diphenyl (known to the trade as "Arochlor") were dissolved by heating at 65° C. for two hours in 40 parts of a solvent consisting of 15 parts of chloroform, 15 parts of methyl alcohol and 10 parts of butyl alcohol. A portion of this solution was poured onto a glass plate which had been previously heated to about 40° C. By means of a suitable doctor knife the solution was spread to an even layer and then aged at 75° C. for one hour to remove the solvent. The resultant plasticized polyamide film was removed from the plate by soaking in water for thirty minutes. The film was clear, elastic, and pliable. It had a tensile strength of 2,170 pounds per square inch calculated on the original dimensions and 7,350 pounds per square inch calculated on break dimensions. When tested on a copper block in the open air the composition melted at 110° C.

*Example II*

Twenty (20) parts of polyhexamethylene adipamide, 10 parts of o-cyclohexylphenol, and 10 parts of polychlorinated diphenyl (known to the trade as "Arochlor") were fused together in an atmosphere of carbon dioxide at 270° C. A homogeneous product resulted which had a melting point of 225° C. when tested on a copper block in the open air. A film molded from this material at 225° C. was pliable and strong.

*Example III*

A polyamide interpolymer was prepared by heating equimolecular parts of hexamethylene diammonium adipate and decamethylenediammonium sebacate at 230°–250° C. under conditions permitting the removal of the water formed during the reaction until the polymer had an intrinsic viscosity of about 1.0. Ten (10) parts of this polyamide, 6 parts of a mixture of tetra- and pentachloroamyl benzene, and 4 parts of diamyl phenol were dissolved in a solution consisting of 10 parts of butyl alcohol, 15 parts of chloroform and 15 parts of methyl alcohol by heating for one hour at 65° C. A portion of this solution was poured on a glass plate and an even film produced by means of a doctor knife. The film was then baked at 100° C. for one hour to remove the solvents. The resultant plasticized polyamide film was removed from the plate by soaking in water for one-half hour. The film was clear, pliable and tough, having a tensile strength of 3,525 pounds per square inch calculated on the original dimensions, and 8,350 pounds per square inch calculated on break dimensions. It melted at 125°–133° C. when tested on a copper block in the open air.

*Example IV*

Five (5) parts of trichlorobenzyl phenyl ether were dissolved in 20 parts of acetone. Five (5) parts of polyhexamethylene adipamide in a finely powdered form were immersed in this solution and the solvent evaporated to dryness. The resulting plasticized polyamide was molded into a chip at 245° C. under 15,000 pounds per square inch to produce a clear, tough and flexible chip.

It is to be understood that the aforementioned examples are merely illustrative of the compositions of this invention and their manner of preparation. As examples of additional synthetic linear condensation polyamides which can be plasticized by the addition of halogenated hydrocarbons and halogenated ethers may be mentioned polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, poly-o-xylylene sebacamide, polyphenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are additional examples of linear condensation polyamides which may be used.

As illustrated in Examples I and III, interpolyamides can likewise be plasticized by the halogenated hydrocarbons. The polyamides used in this invention are those in which the amide groups form an integral part of the main chain of atoms. Thus, instead of the polyamides mentioned above which are obtainable from bifunctional polyamide-forming reactants as essentially sole reactants, there may be used the linear condensation polyamides obtained by including with the polyamide-forming reactants used to prepare the polyamide other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxy acids. Although these products contain ester linkages, they can still be classed as polyamides since they contain a plurality of amide linkages and retain many of the desirable properties of the straight polyamides. The invention is also applicable to mixtures of polyamides. In general the synthetic linear condensation polyamides do not possess fiber-forming properties unless they have an intrinsic viscosity above 0.4. Likewise, to be useful in making films, ribbons, tubes, rods, etc., the polyamide should have an intrinsic viscosity above 0.4 and preferably above 0.6 The expression, intrinsic viscosity, is to be understood in accordance with the definition thereof contained in U. S. Patent 2,130,948, which was issued to the applicant on September 20, 1938, on an application which was copending herewith.

As additional examples of halogenated hydrocarbons and halogenated ethers which may be used in making the compositions of this invention, there may be mentioned chlorinated ethyl benzene, tetrachlorobenzene, pentachlorobenzene, hexachlorobenzene, tetrabromobenzene, pentabromobenzene, hexabromobenzene, pentachlorodiphenyl, hexachlorodiphenyl, octachlorodiphenyl, polychlorinated naphthalene, polychlorinated anthracene, polychlorinated diphenyl ether, polychlorinated benzyl phenyl ether, polychlorinated alkyl benzenes, and polymerized chloroprene.

As already indicated, the plasticizing effect in the halogenated hydrocarbons and ethers is increased by the presence of a small amount of water. Other hydroxylated nonsolvents for the polymers, and particularly alcohols such as methanol, propanol, isobutanol, benzyl alcohol, cyclohexanol, hexamethylene glycol, and glycerol, have a similar effect. Moreover, there may be associated with the polyamide-halogenated hydrocarbon or halogenated hydrocarbon ether compositions other types of plasticizers, e. g. dibutyl phthalate, tricresyl phosphate, monobasic acids boiling above 200° C. such as butyl adipic and preferably hydroxy acids such as salicylic, lactic, mandelic, etc.; monomeric amides boiling above 220° C. and particularly sulfonamides such as the N-ethyl toluene sulfonamides; phenols, such as 4-tertiary butyl or amyl phenol, diphenylol propane and dicresyl carbitol. Particularly desirable compositions are obtained by using the halogenated hydrocarbon or halogenated ether in conjunction with a phenol (Example III) or a sulfonamide. Compositions of this invention may also contain other types of modifying agents, e. g luster modifying materials, pigments, dyes, antioxidants, oils, antiseptics, cellulose derivatives, etc Typical applications of the compositions of this invention are yarns, fabrics, bristles, surgical sutures, dental floss, fish lines, fishing leadeds, rods, tubes, films, ribbons, sheets, safety glass interlayers, electrical insulation (e. g. for wires), molded articles, adhesives, impregnating agents and coating compositions. An advantage which these compositions have over unmodified polyamides is that they are more pliable. This is most important in connection with the use of a product in sheet form.

Typical uses for the product in this form are wrapping foils, metallized foils, leather substitutes, tile substitutes, washers, spiral tubes, goggles, wind shields, glass and isinglass substitute, diaphragms for loud speakers, etc., raincapes, lamp shades, umbrellas, hats, translucent picture projection screens, collapsible tubes for soaps, etc., bottle caps, fan blades, airplane wings, heat insulation, belting, transparent straps, e. g. for women's underclothes, playing cards, table cloths, e. g. for card tables, printing blankets, acid and alkali shields, and window shades. These products are also useful in the preparation of blown articles such as toys, hollow toilet ware, etc. Ribbons or strips are useful as reeds for weaving chairs and baskets.

By reason of the fact that these compositions soften over a greater range and at lower temperatures than unmodified polyamides, they are particularly adapted for molding into cakes which may be sliced into sheets of any desired thickness. Furthermore, the plastic nature of these compositions permits them to be milled and calendered on standard rubber working equipment. Certain of the interpolyamides plasticized with halogenated hydrocarbons and halogenated hydrocarbon ethers have sufficient plastic flow to permit them to be extruded below their melting points, and thus may be formed into tubes and hose suitable for use as rubber substitutes.

A further advantage of these compositions over unmodified polyamides is that they are more readily cold rolled. A still further advantage is that halogenated hydrocarbon, or halogenated hydrocarbon ether modified polyamides have less tendency to discolor than unmodified polyamides. Certain of the compositions have electrical properties superior to those of the unmodified polyamides.

As many apparently widely different embodiments of this invention may be made without departing from the spirit and scope thereof, it is to be understood that the invention is not limited to the specific embodiments thereof except as defined in the appended claims.

What is claimed is:

1. A plasticized synthetic linear polyamide containing as the plasticizing agent a compound of the class consisting of halogenated hydrocarbons and halogenated hydrocarbon ethers, the said polyamide being capable of being drawn into continuous filaments which show by characteristic X-ray patterns orientation along the fiber axis.

2. A plasticized synthetic linear condensation polyamide containing as the plasticizing agent a compound of the class consisting of halogenated hydrocarbons and halogenated hydrocarbon ethers, the said polyamide being capable of being drawn into continuous filaments which show by characteristic X-ray patterns orientation along the fiber axis.

3. A synthetic linear polyamide plasticized with a mixture comprising an hydroxylated nonsolvent for the polyamide and a compound of the class consisting of halogenated hydrocarbons and halogenated hydrocarbon ethers, the said polyamide being capable of being drawn into continuous filaments which show by characteristic X-ray patterns orientation along the fiber axis.

4. A synthetic linear polymer plasticized with a compound of the class consisting of halogenated hydrocarbons and halogenated hydrocarbon ethers, said polymer being one which yields on hydrolysis with hydrochloric acid a mixture comprising a diamine hydrochloride and a dibasic acid, and said polymer being capable of being drawn into continuous filaments which show by characteristic X-ray patterns orientation along the fiber axis.

5. An article of manufacture comprising a plasticized synthetic linear polyamide in the form of filaments, bristles, rods, tubes, sheets and the like, said polyamide containing as the plasticizing agent a compound of the class consisting of halogenated hydrocarbons and halogenated hydrocarbon ethers, the said polyamide being capable of being drawn into continuous filaments which show by characteristic X-ray patterns orientation along the fiber axis.

6. A plasticized synthetic linear polyamide containing as the plasticizing agent a nuclearly halogenated hydrocarbon, the said polyamide being capable of being drawn into continuous filaments which show by characteristic X-ray patterns orientation along the fiber axis.

7. A plasticized synthetic linear polyamide containing as the plasticizing agent a nuclearly chlorinated hydrocarbon, the said polyamide being capable of being drawn into continuous filaments which show by characteristic X-ray patterns orientation along the fiber axis.

8. A plasticized synthetic linear polyamide containing as the plasticizing agent a halogenated polynuclear hydrocarbon, the said polyamide being capable of being drawn into continuous filaments which show by characteristic X-ray patterns orientation along the fiber axis.

9. The plasticized polyamide set forth in claim 1 in which said agent is present in amount of 1% to 50% based on the weight of the polyamide.

10. A synthetic linear polymer plasticized with a compound of the class consisting of halogenated hydrocarbons and halogenated hydrocarbon ethers, said polymer being one which yields on hydrolysis with hydrochloric acid an amino acid hydrochloride, and said polymer being capable of being drawn into continuous filaments which show by characteristic X-ray patterns orientation along the fiber axis.

11. A plasticized synthetic linear polyamide containing as the plasticizing agent a compound of the class consisting of halogeated hydrocarbons and halogenated ethers, the said polyamide being one which has an intrinsic viscosity of at least 0.4.

12. A plasticized synthetic linear polyamide containing as the plasticizing agent a compound of the class consisting of halogenated hydrocarbons and halogenated ethers, and also containing a hydroxylated non-solvent for the polyamide; the said polyamide being one which has an intrinsic viscosity of at least 0.4.

13. The product of claim 11 containing as the plasticizing agent a nuclearly halogenated hydrocarbon.

WILMINGTON TRUST COMPANY,
*Executor of the Estate of Wallace Hume Carothers, Deceased,*

By ELWYN EVANS,
*Vice President.*